(12) United States Patent
Koide et al.

(10) Patent No.: US 9,261,035 B2
(45) Date of Patent: Feb. 16, 2016

(54) INDUSTRIAL VEHICLE

(71) Applicant: KABUSHIKI KAISHA TOYOTA JIDOSHOKKI, Kariya-shi, Aichi-ken (JP)

(72) Inventors: Yukikazu Koide, Aichi-ken (JP); Norihiko Kato, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/667,776

(22) Filed: Mar. 25, 2015

(65) Prior Publication Data
US 2015/0275799 A1 Oct. 1, 2015

(30) Foreign Application Priority Data
Mar. 26, 2014 (JP) ................................ 2014-064794

(51) Int. Cl.
| | | |
|---|---|---|
| *B60K 31/00* | (2006.01) | |
| *F02D 41/08* | (2006.01) | |
| *B66F 9/075* | (2006.01) | |
| *F02D 29/02* | (2006.01) | |

(52) U.S. Cl.
CPC ............. *F02D 41/08* (2013.01); *B60K 31/00* (2013.01); *B66F 9/07572* (2013.01); *F02D 29/02* (2013.01); *B60K 2031/0091* (2013.01)

(58) Field of Classification Search
USPC .......................................................... 701/5
See application file for complete search history.

(56) References Cited

U.S. PATENT DOCUMENTS

| | | | | | |
|---|---|---|---|---|---|
| 4,885,960 | A * | 12/1989 | Maeda | ..................... | F16H 61/20 477/114 |
| 8,321,113 | B2 * | 11/2012 | Ishikawa | ................... | B60T 1/10 701/70 |
| 8,919,314 | B2 * | 12/2014 | Saito | ................... | F02N 11/0822 123/179.4 |
| 2007/0010927 | A1 * | 1/2007 | Rowley | ................. | B60W 10/02 701/51 |
| 2008/0154472 | A1 * | 6/2008 | Okuda | ..................... | B60K 6/44 701/93 |
| 2011/0320067 | A1 * | 12/2011 | Ishikawa | ................... | B60T 1/10 701/2 |

FOREIGN PATENT DOCUMENTS

JP 2001-323826 A 11/2011

* cited by examiner

*Primary Examiner* — Thomas Tarcza
*Assistant Examiner* — Alex C Dunn
(74) *Attorney, Agent, or Firm* — Sughrue Mion, PLLC

(57) ABSTRACT

An industrial vehicle has an engine, a drive wheel, and a power transmission mechanism that transmits power of the engine to the drive wheel wherein the power transmitted through the power transmission mechanism causes creeping of the vehicle. The industrial vehicle includes a control unit that controls an engine speed of the engine and a vehicle speed detection unit that detects a vehicle speed of the vehicle. The control unit controls the engine speed at a first engine speed when the vehicle is in a non-traveling state, and when the vehicle speed has exceeded a predetermined vehicle speed, the control unit controls the engine speed at a second engine speed that is lower than the first engine speed, and the second engine speed is set to generate a desired creeping speed.

4 Claims, 2 Drawing Sheets

INDUSTRIAL VEHICLE

BACKGROUND OF THE INVENTION

The present invention relates to an industrial vehicle in which the power of an engine is transmitted to drive wheels through a power transmission mechanism and in which creeping of the vehicle occurs.

There has been a vehicle which is provided with a power transmission mechanism that transmits the power of an engine. In the vehicle, the power transmitted through the power transmission mechanism causes creeping of the vehicle (see Japanese Unexamined Patent Application Publication No. 2001-323826). Such creeping is useful for starting a vehicle smoothly.

An industrial vehicle such as a forklift truck may have an engine mounted immediately below the driver's seat due to the limited size of the vehicle. In such vehicle, the driver's seat is subjected to the vibration of the engine. Therefore, there has been a demand for controlling the engine vibration. Furthermore, the engine of the forklift truck that may be used for loading operations near a rack or the like is required to operate with stability during the loading operations with the forklift truck being at a stop. The idling speed of the forklift truck may be set relatively high for the purpose of suppression of the vibration and stabilized operation of the engine of the forklift truck.

The creeping occurs also in an industrial vehicle, such as a forklift truck, if the power transmission mechanism of the engine of the vehicle includes a torque converter and an automatic transmission. Therefore, in the above case of the forklift truck in which the idling speed is set relatively high, the vehicle is required to creep at a desired stabilized speed so that loading operations may be performed safely near a rack or the like while the forklift truck is at a stop or traveling at a crawling speed.

The present invention, which has been made in view of such problems underlying the background art, is directed to providing an industrial vehicle that achieves a desired creeping speed.

SUMMARY OF THE INVENTION

In accordance with the present invention, there is provided an industrial vehicle having an engine, a drive wheel, and a power transmission mechanism that transmits power of the engine to the drive wheel wherein the power transmitted through the power transmission mechanism causes creeping of the vehicle. The industrial vehicle includes a control unit that controls an engine speed of the engine and a vehicle speed detection unit that detects a vehicle speed of the vehicle. The control unit controls the engine speed of the vehicle at a first engine speed when the vehicle is -in a non-traveling state, and when the vehicle speed has exceeded a predetermined vehicle speed due to a transition of the vehicle to a state of power transmission in which the power of the engine is transmitted to the drive wheel, the control unit controls the engine speed at a second engine speed that is lower than the first engine speed. The second engine speed is set to generate a desired creeping speed.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the embodiment together with the accompanying drawings in which.

DETAILED DESCRIPTION OF THE PREFERRED EMBODIMENTS

Figure 1:
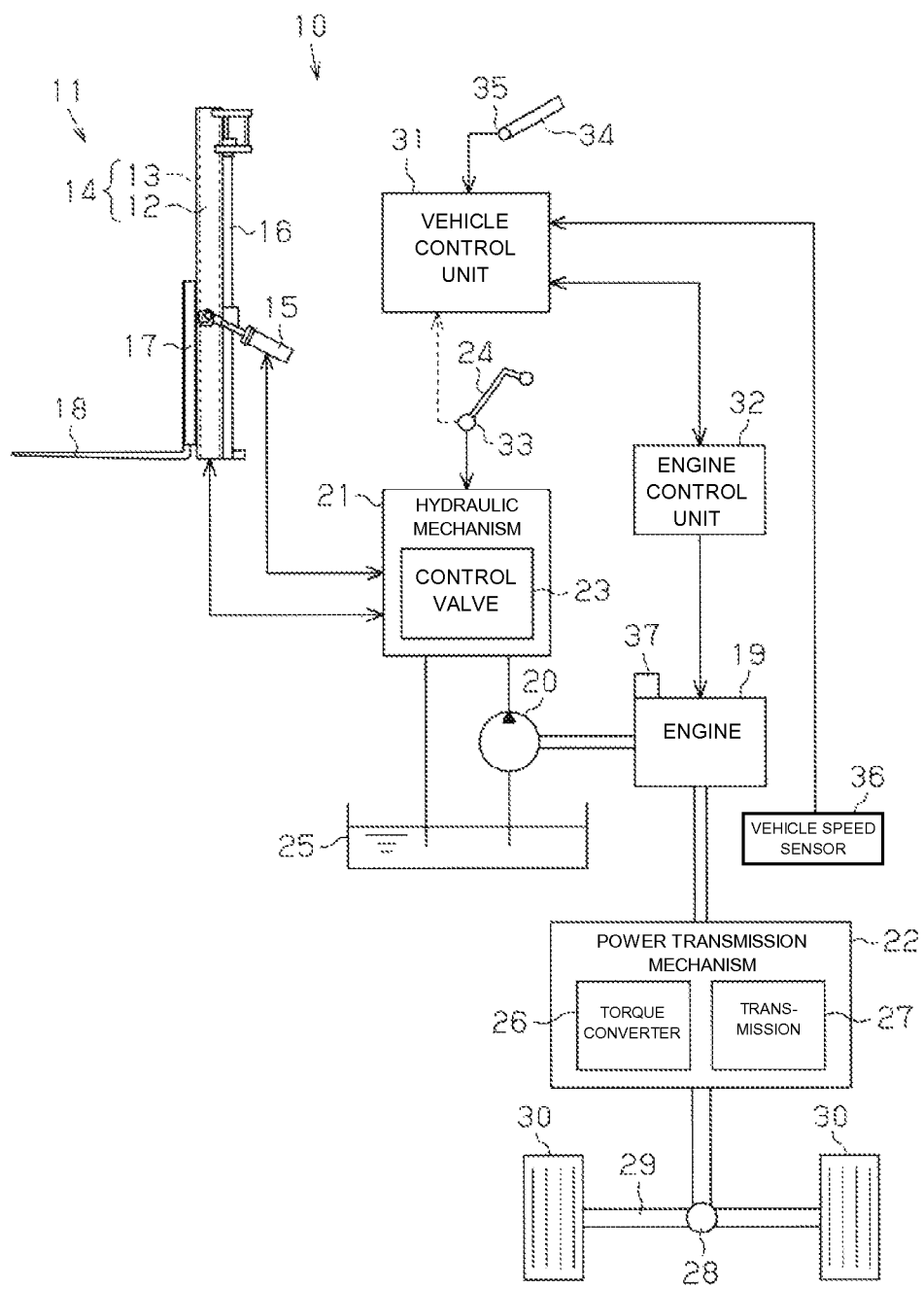
FIG. 1 is a schematic view showing an overall configuration of a forklift truck according to an embodiment of the present invention.
Figure 2:
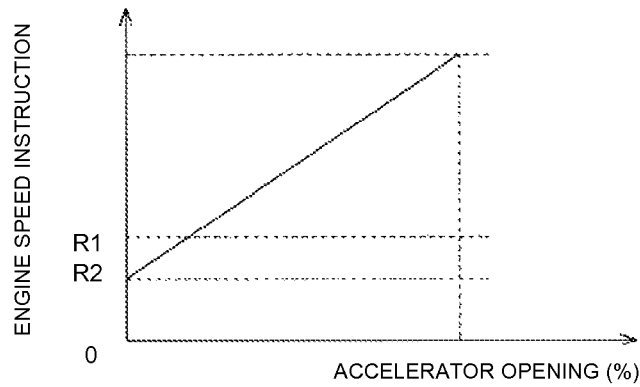
FIG. 2 is a graph showing a relationship between an engine speed instruction and an accelerator opening of the forklift truck in FIG. 1.

The following will describe an embodiment of an industrial vehicle according to the present invention with reference to FIGS. 1 to 3.

Referring to FIG. 1, there is schematically shown a forklift truck that is designated generally by 10. The forklift truck 10 as a vehicle of the present invention includes vehicle body (not shown) having mounted thereon a loading unit 11. The loading unit 11 has a multi-stage mast assembly 14 including a pair of right and left outer masts 12 and a pair of right and left inner masts 13. Each outer mast 12 is connected to a hydraulic tilt cylinder 15. Each inner mast 13 is connected to a hydraulic lift cylinder 16. The mast assembly 14 is tiltable in the forward and rearward directions of the forklift truck 10 according to the flow of hydraulic oil to and from the tilt cylinders 15. The inner masts 13 are movable upward and downward in the vertical direction of the forklift truck 10 according to the flow of hydraulic oil to and from the lift cylinders 16. Forks 18 are mounted to the inner masts 13 via lift brackets 17. The inner masts 13 are movable up and down along the outer masts 12 by the operation of the lift cylinders 16, which moves the forks 18 up and down together with the lift brackets 17.

The forklift truck 10 includes an engine 19 as a drive source for the traveling operation and the loading operation of the forklift truck 10, a hydraulic pump 20 that is driven by the engine 19 to deliver hydraulic oil under pressure, a hydraulic mechanism 21 to which the hydraulic oil is supplied from the hydraulic pump 20, and a power transmission mechanism 22 that transmits output power of the engine 19.

The hydraulic mechanism 21 has a control valve 23 through which the flow of the hydraulic oil to and from the tilt cylinders 15 and the lift cylinders 16 is controlled. A loading operation member 24 which is manipulated by an operator of the forklift truck 10 for instructing operation of the tilt cylinders 15 and the lift cylinders 16 is mechanically connected to the control valve 23 of the hydraulic mechanism 21. The control valve 23 of the hydraulic mechanism 21 is opened or closed according to the operation of the loading operation member 24. An oil tank 25 is connected to the hydraulic mechanism 21 directly and through the hydraulic pump 20. The hydraulic oil in the oil tank 25 is pumped by the hydraulic pump 20 and supplied to the tilt cylinders 15 and the lift cylinders 16 through the hydraulic mechanism 21. The hydraulic oil flowed out from the tilt cylinders 15 and the lift cylinders 16 is returned to the oil tank 25 through the hydraulic mechanism 21.

The power transmission mechanism 22 has devices for transmitting power such as a torque converter 26 and a transmission 27. An axle 29 is connected to the engine 19 through the power transmission mechanism 22 and a differential gear 28. Two drive wheels 30 are mounted on the opposite ends of the axle 29. The output power of the engine 19 is transmitted to the drive wheels 30 through the power transmission mechanism 22, the differential gear 28, and the axle 29.

The forklift truck 10 further includes as the control unit of the present invention a vehicle control unit 31 and an engine control unit 32. The engine control unit 32 is electrically connected to the vehicle control unit 31. The vehicle control unit 31 is electrically connected with a detection sensor 33 that detects the operational state of the loading operation member 24 and an acceleration sensor 35 as the accelerator opening detection unit of the present invention that detects an opening of an accelerator pedal 34 according to the operated amount of the accelerator pedal 34. The accelerator pedal 34 corresponds to the accelerator of the present invention. The vehicle control unit 31 is electrically connected with a vehicle speed sensor 36 as the vehicle speed detection unit of the present invention that detects a speed of the forklift truck 10.

The vehicle control unit 31 generates an engine speed instruction to the engine control unit 32 to control the speed of the engine 19. The engine control unit 32 controls the engine 19 in response to the engine speed instruction. The engine control unit 32 generates to the vehicle control unit 31 a signal that is indicative of the engine speed detected by an engine speed sensor 37. It is to be noted that, in the forklift truck 10 in which the hydraulic pump 20 is driven by the engine 19, the tilt cylinders 15 and the lift cylinders 16 are operated by manipulating the loading operation member 24 while depressing the accelerator pedal 34.

The control of the engine speed of the forklift truck 10 according to the present embodiment and the effects thereof will now be described with reference to FIGS. 2 and 3.

As shown in FIG. 2, the vehicle control unit 31 calculates an engine speed instruction based on an accelerator opening and generates the resultant engine speed instruction. When the accelerator opening is 0%, i.e. when the accelerator pedal 34 is not depressed, the vehicle control unit 31 according to the present embodiment generates an engine speed instruction that instructs an engine speed R1 as the engine speed. The engine speed R1 is an idling speed of the forklift truck 10 when the accelerator opening of the forklift truck 10 is 0% (the forklift truck 10 is in a stop state with the vehicle speed of 0 km/h) and the forklift truck 10 is or in a non-traveling state. When the accelerator pedal 34 is operated and the accelerator opening is increased, the vehicle control unit 31 generates an engine speed instruction for increasing the engine speed according to the increased accelerator opening.

In the forklift truck 10, the engine 19 may be disposed just below the driver's seat. In such case, the vibration of the engine 19 is transmitted to the driver's seat easily. Vibration control is also required on the engine at the idling speed at which the forklift truck 10 is stopped. Furthermore, the engine 19 of the forklift truck 10 that is used for loading operation near a rack or the like is required to operate with stability during the loading operation with the forklift truck 10 being in a stop state. Therefore, in the forklift truck 10 according to the present embodiment, the idling speed (or the engine speed R1) is set relatively high for the purpose of suppression of the vibration and the stabilized operation of the engine 19 of the forklift truck 10.

When the power transmission mechanism 22 is configured with a fluid power transmission mechanism such as the torque converter 26 and the automatic transmission 27, the forklift truck 10 creeps or moves forward at a low speed with the engine 19 idling without operating the accelerator pedal 34 during a transition to the power transmission for transmitting power of the engine 19 to the drive wheels 30. Such transition occurs, for example, when the transmission shift lever is moved from the neutral position to the drive position. In the forklift truck 10 that is in a stop state or traveling at a crawling speed in performing the loading operation near a rack or the like, the creeping of the forklift truck 10 needs to be stabilized to a desired speed.

In the forklift truck 10 according to the present embodiment in which the idling speed is set relatively high, the engine speed is controlled in the manner as described below so as to stabilize the creeping to a desired speed.

In FIG. 2, the engine speed R1 represents a first engine speed and an engine speed R2 represents a second engine speed at which the forklift truck 10 creeps at the desired speed and data for such engine speeds R1, R2 is previously stored in the vehicle control unit 31. It is to be noted that the engine speed R2 is lower than the engine speed R1.

The second engine speed R2 is calculated by simulation testing or the like. Alternatively, with the details of the vehicle, such as the structure of the power transmission mechanism 22 or the tire diameter, the second engine speed R2 can be calculated from the following equations (1) to (5).

$$\text{Target tire rotional speed (rpm)} = \frac{\text{Target vehicle speed (km/h)}}{\text{Tire circumference (m)}} \quad (1)$$

$$\text{Target } TC \text{ output speed (rpm)} = \frac{\text{Target tire rotational speed (rpm)}}{\text{Gear ratio}} \quad (2)$$

$$\text{Target } TC \text{ input speed (rpm)} = \frac{\text{Target } TC \text{ output speed (rpm)}}{TC \text{ speed ratio}} \quad (3)$$

$$\text{Target idling speed (rpm)} = \text{Target } TC \text{ input speed (rpm)} \quad (4)$$

$$\text{Engine speed } R2 = \text{Target idling speed (rpm)} \quad (5)$$

where

Speeds in equations (1) through (5) are represented by rpm;

Target vehicle speed in equation (1) is represented by m/min;

Tire circumference in equation (1) is represented by m; and

TC in equations (2) through (4) stands for a torque converter.

The vehicle control unit 31 monitors the vehicle speed of the forklift truck 10 based on the detection results of the vehicle speed sensor 36.

Figure 3A:
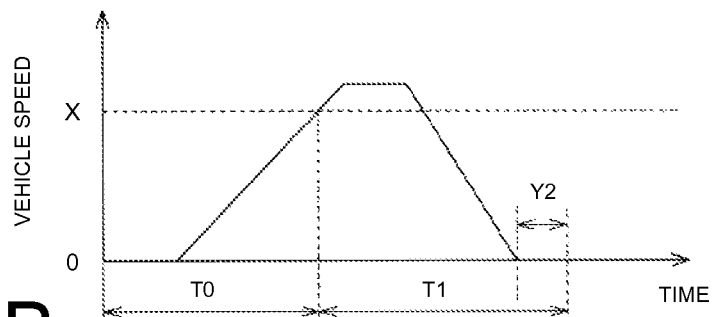
FIG. 3A is a graph showing an example of a change of the vehicle speed.
Figure 3B:
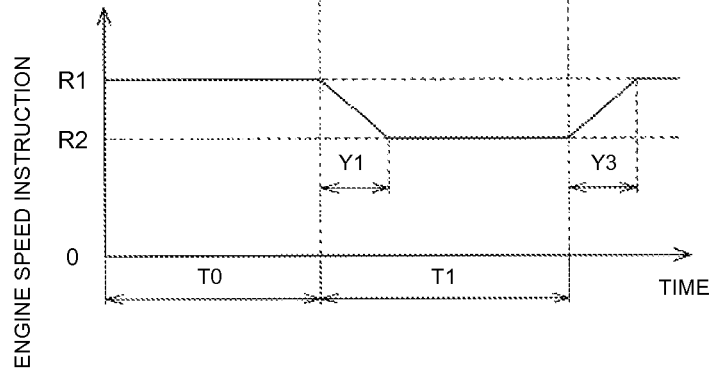
FIG. 3B is a graph showing a change of the engine speed instruction according to the change of the vehicle speed in FIG. 3A.

As shown in FIGS. 3A and 3B, in a period of time T0 during which the vehicle speed is in the range between 0 km/h and X km/h, the vehicle control unit 31 generates an engine speed instruction for the engine 19 to be controlled at the engine speed R1. Accordingly, in response to this, the engine 19 is controlled at the engine speed R1 that is an engine speed for controlling the aforementioned vibration of the forklift truck 10 during the period T0.

Upon determining that the vehicle speed has reached a vehicle speed X (FIG. 3A), the vehicle control unit 31 generates an engine speed instruction for the engine speed to be reduced from the engine speed R1 to the engine speed R2 (FIG. 3B). The vehicle speed X herein is the vehicle speed at which the accelerator opening is 0% (i.e., the forklift truck 10 is in a stop state) and at which the forklift truck 10 creeps. Then, the engine 19 is controlled to run at the engine speed R2 so that forklift 10 creeps at a desired stabilized creeping speed in a period of time T1 during which the vehicle speed is at the speed X. Specifically, the vehicle control unit 31 changes the idling speed from the engine speed R1 to the engine speed R2. At this time, the vehicle control unit 31 generates an engine speed instruction for gradually changing the engine speed from the engine speed R1 to the engine speed R2 during a predetermined period of time Y1. Such gradual reduction of the engine speed from the engine speed R1 to the engine speed R2 helps to suppress a rapid change in the vehicle speed.

As shown in FIG. 2, as the accelerator pedal 34 is depressed, the vehicle control unit 31 generates an engine speed instruction according to the accelerator opening or the operated amount of the accelerator pedal 34. Accordingly, the engine 19 of the forklift truck 10 is controlled to run at the engine speed according to the accelerator opening and the forklift truck 10 travels according to the accelerator opening.

As shown FIGS. 3A and 3B, when the vehicle speed has reached 0 km/h during the period of time T1, the vehicle control unit 31 starts measuring the time from the moment at which the vehicle speed has become zero. It is to be noted that the accelerator opening, i.e., the operated amount of the accelerator pedal 34, is 0% when the vehicle speed is 0 km/h. When the measured time reaches a time elapsed Y2 (FIG. 3A), the vehicle control unit 31 generates an engine speed instruction for the engine 19 to reduce its engine speed from the engine speed R2 to the engine speed R1. The duration of time elapsed Y2 is set, for example, at a few hundred milliseconds, for example, which enables determination that the forklift truck 10 is substantially in a stop state. Then the vehicle control unit 31 generates an engine speed instruction for the engine 19 to reduce its speed gradually from the engine speed R2 to the engine speed R1 in a predetermined period of time Y3.

According to the present embodiment, the following effects are obtained.

(1) The engine 19 of the forklift truck 10 in a non-traveling state is controlled to run at the engine speed R1 and, when the vehicle speed has exceeded the vehicle speed X in the transition to the engine power transmission, the engine speed is changed from the engine speed R1 to the engine speed R2. Accordingly, in the forklift truck 10 in which the engine speed is set relatively high when the forklift truck 10 is in a non-traveling state, the forklift truck 10 creeps at a desired stabilized speed.

(2) Controlling the engine speed at the engine speed R1 while the forklift truck 10 is in a non-traveling state, the vibration of the forklift truck 10 in the non-traveling state is suppressed and the stability of the engine 19 is ensured.

(3) When the state in which the vehicle speed is zero (or the forklift truck 10 is in a stop state) has continued for the time elapsed Y2, the engine speed is controlled at the engine speed R1 (the engine speed is restored to R1). Therefore, the stopped state of the forklift truck 10 is detected with certainty and the vibrations of the forklift truck 10 in the stop state is suppressed, so that the stability of the engine 19 is ensured.

(4) Changing of the engine speed from the engine speed R1 to the engine speed R2 is accomplished gradually, so that a rapid change in the vehicle speed due to the change of the engine speed is suppressed and, therefore, the creeping of the vehicle is stabilized.

(5) Changing of the engine speed from the engine speed R2 to the engine speed R1 is also accomplished gradually, so that the vibration of the engine 19 due to a rapid change in the engine speed or the like and hence the vibration of the forklift truck 10 is suppressed.

(6) The vehicle control unit 31 controls the engine 19 to run at an engine speed according to the accelerator opening. According to this control, when the accelerator opening is 0%, the engine 19 is controlled at the engine speeds R1 and R2 according to the vehicle speed. As a result, the vibration of the forklift truck 10 is suppressed and the forklift truck 10 creeps at the desired speed. Furthermore, when the accelerator pedal 34 is operated, the engine speed is controlled in accordance with an increase in the opening amount of the accelerator pedal 34. In other words, when the accelerator pedal 34 is operated, the engine speed is increased continuously with an increase in the accelerator opening.

It is to be noted that the above embodiment may be modified variously as follows.

The engine speed may be changed from the engine speed R2 to the engine speed R1 rapidly when the vehicle speed becomes 0 km/h.

In the case that the speed difference in the engine speed is small between the engine speed R1 and the engine speed R2 and therefore the change in the vehicle speed is small the engine speed may be changed from the engine speed R1 to the engine speed R2 directly. The same is true of the speed change from the engine speed R2 to the engine speed R1.

The relationship between the accelerator opening and the engine speed instruction shown in FIG. 2 may be changed as required. For example, the relationship between the accelerator opening and the engine speed instruction may be what can be expressed by a primary expression or a secondary expression.

The control valve 23 may be an electromagnetic valve and the operation thereof may be controlled using signals from the vehicle control unit 31.

The control according to the present embodiment may be applied to industrial vehicles other than forklift trucks, such as a tractor or a towing tractor.

What is claimed is:

1. An industrial vehicle including an engine, a drive wheel, and a power transmission mechanism that transmits power of the engine to the drive wheel wherein the power transmitted through the power transmission mechanism causes creeping of the vehicle, the industrial vehicle comprising:
a control unit that controls an engine speed of the engine; and
a vehicle speed detection unit that detects a vehicle speed of the vehicle, wherein
the control unit controls the engine speed at a first engine speed when the vehicle is in a non-traveling state, and when the vehicle speed has exceeded a predetermined vehicle speed due to a transition to a state of power transmission in which the power of the engine is transmitted to the drive wheel, the control unit controls the engine speed at a second engine speed that is lower than the first engine speed, and
the second engine speed is set to generate a desired creeping speed.

2. The industrial vehicle according to claim 1, wherein when a state in which the vehicle speed is zero has continued for a predetermined period of time, the control unit controls the engine speed at the first engine speed.

3. The industrial vehicle according to claim 1, wherein when the engine speed is changed from the first engine speed to the second engine speed, the control unit changes the engine speed gradually.

4. The industrial vehicle according to claim 1, further comprising an accelerator and an accelerator opening detection unit that detects an opening of the accelerator, wherein the control unit controls the engine speed according to the opening of the accelerator.

\* \* \* \* \*